United States Patent
Yoon et al.

(10) Patent No.: US 11,353,581 B2
(45) Date of Patent: Jun. 7, 2022

(54) SYSTEM AND METHOD FOR LOCALIZATION FOR NON-LINE OF SIGHT SOUND SOURCE

(71) Applicant: Korea Advanced Institute of Science and Technology, Daejeon (KR)

(72) Inventors: Sung-Eui Yoon, Daejeon (KR); Inkyu An, Daejeon (KR); Doheon Lee, Daejeon (KR); Jung Woo Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 230 days.

(21) Appl. No.: 16/509,742

(22) Filed: Jul. 12, 2019

(65) Prior Publication Data
US 2020/0225344 A1  Jul. 16, 2020

(30) Foreign Application Priority Data
Jan. 14, 2019  (KR) .......... 10-2019-0004707

(51) Int. Cl.
| *G01S 15/06* | (2006.01) |
| *G01N 29/06* | (2006.01) |
| *H04S 7/00* | (2006.01) |
| *G01H 7/00* | (2006.01) |
| *G01S 15/46* | (2006.01) |

(52) U.S. Cl.
CPC .............. *G01S 15/06* (2013.01); *G01H 7/00* (2013.01); *G01N 29/0663* (2013.01); *H04S 7/305* (2013.01); *G01S 2015/465* (2013.01)

(58) Field of Classification Search
CPC ...... G01S 15/06; G01S 2015/465; G01S 5/22; G01H 7/00; G01H 3/125; G01N 29/0663; H04S 7/305; H04R 3/005; H04R 2430/23; H04R 1/406
See application file for complete search history.

(56) References Cited

U.S. PATENT DOCUMENTS

| 8,885,442 B2 * | 11/2014 | Agevik ..................... G01H 7/00 367/118 |
| 9,940,922 B1 * | 4/2018 | Schissler ................. G10K 15/08 |
| 2006/0153391 A1 * | 7/2006 | Hooley .................... H04S 7/301 381/17 |

(Continued)

FOREIGN PATENT DOCUMENTS

CN  104535964 A  *  4/2015

OTHER PUBLICATIONS

Takami, Non-Field-of-View Sound Source Localization Using Diffraction and Reflection Signals, 2016, IEEE/RSJ Intl Confr on Intelligent Robots and Systems (IROS), pp. 157-162 (Year: 2016).*

(Continued)

*Primary Examiner* — Isam A Alsomiri
*Assistant Examiner* — Vikas Atmakuri
(74) *Attorney, Agent, or Firm* — Occhiuti & Rohlicek LLP

(57) ABSTRACT

Disclosed is a method and system for diffraction-aware non-line of sight (NLOS) sound source localization (SSL) that may reconstruct an indoor space, may generate acoustic rays into the indoor space based on an audio signal collected from the indoor space, and may estimate a position of an NLOS sound source based on a point at which one of the acoustic rays is diffracted.

21 Claims, 14 Drawing Sheets

(56) References Cited

U.S. PATENT DOCUMENTS

| | | | | |
|---|---|---|---|---|
| 2009/0046864 A1* | 2/2009 | Mahabub | .................. | H04S 7/30 |
| | | | | 381/17 |
| 2014/0161268 A1* | 6/2014 | Antani | .................... | H04S 7/305 |
| | | | | 381/63 |
| 2015/0373477 A1* | 12/2015 | Norris | .................... | H04S 1/007 |
| | | | | 381/303 |
| 2016/0034248 A1* | 2/2016 | Schissler | ................ | G06F 3/165 |
| | | | | 381/17 |
| 2018/0146285 A1* | 5/2018 | Benattar | ................ | H04R 3/005 |
| 2018/0232471 A1* | 8/2018 | Schissler | ................ | G06K 9/627 |

OTHER PUBLICATIONS

An, Reflection-Aware Sound Source Localization, arXiv, IEEE International Conference on Robotics and Automation (ICRA), 2017 (Year: 2017).*

Pourmohammad, N-dimensional N-microphone sound source localization, EURASIP Journal on Audio, Speech, and Music Processing, 2013, pp. 1-19 (Year: 2013).*

Taylor, Guided Multiview Ray Tracing for Fast Auralization, IEEE Transactions on Visualization and Computer Graphics, vol. 18, No. 11, 1797-1810 (Year: 2012).*

Manocha, High-Order Diffraction and Diffuse Reflections for Interactive Sound Propagation in Large Environments, ACM Transactions on Graphics, vol. 33, No. 4, Article 39, 1-12 (Year: 2014).*

Tsingos, Modeling Acoustics in Virtual Environments Using the Uniform Theory of Diffraction, Proceedings of ACM SIGGRAPH, 545-553 (Year: 2001).*

* cited by examiner

Microphone array

SYSTEM AND METHOD FOR LOCALIZATION FOR NON-LINE OF SIGHT SOUND SOURCE

CROSS-REFERENCE TO RELATED APPLICATION

This application claims the priority benefit of Korean Patent Application No. 10-2019-0004707, filed on Jan. 14, 2019, in the Korean Intellectual Property Office, the disclosure of which is incorporated herein by reference.

BACKGROUND

1. Field of the Invention

The following description of example embodiments relates to a method and system for diffraction-aware non-line of sight (NLOS) sound source localization (SSL).

2. Description of the Related Art

As robots are increasingly used in daily lives, the demand for interaction using sound of a human and a robot is also on the increase. In particular, the popularity of smart speaker products has triggered great challenges in acoustic related research. One of the greatest issues in such applications is to localize an accurate position of a sound source in a real environment. Localizing the position of the sound source in the real environment is known as a sound source localization (SSL).

In the field of sound source localization/tracing, research on localizing an incoming direction of sound, that is, sound source has been conducted over the past 20 years. For example, there are methods of tracing, that is, localizing a position of sound based on a time difference of arrival (TDOA) between two microphones. The methods of localizing the position of sound based on the TDOA may succeed in localizing the incoming direction of sound, however, may have difficulty in localizing an accurate three-dimensional (3D) position of the sound source.

A recent sound source location (SSL) method attempts to localize a 3D position of a sound source, however, requires accumulation of sensor data about a plurality of positions and angles of a measurement device. Accordingly, a situation in which sequential sound signals are generated in a stationary sound source may be used and an operation is allowed only when an obstacle is absent between the sound source and a microphone.

SUMMARY

Example embodiments provides technology for localizing a position of a sound source in a three-dimensional (3D) space in an actual environment in which an obstacle is present between a sound source and a microphone.

According to an aspect of example embodiments, there is provided a method for reflection-aware sound source localization (SSL) implemented by a computer, the method including collecting an audio signal input through a microphone array mounted to a robot, with respect to a 3D scene representing an indoor space; generating acoustic rays through reflection-aware acoustic ray tracing based on the collected an audio signal; and estimating a 3D position of a sound source based on the generated acoustic rays. The input audio signal includes a direct acoustic ray output from the sound source and an indirect acoustic ray reflected by an object on a space.

According to an aspect of example embodiments, there is provided a system for reflection-aware sound source localization, the system including a signal collector configured to collect an audio signal input through a microphone array mounted to a robot, with respect to a 3D scene representing an indoor space; an acoustic ray generator configured to generate acoustic rays through reflection-aware acoustic ray tracing based on the collected audio signal; and a position estimator configured to estimate a 3D position of a sound source based on the generated acoustic rays. The input audio signal includes a direct acoustic ray output from the sound source and an indirect acoustic ray reflected by an object on a space.

According to an aspect of example embodiments, there is provided a method for diffraction-aware non-line of sight (NLOS) sound source localization (SSL) implemented by a computer, the method including reconstructing an indoor space; generating acoustic rays into the indoor space based on an audio signal collected from the indoor space; and estimating a position of an NLOS sound source based on a point at which one of the acoustic rays is diffracted.

According to an aspect of example embodiments, there is provided a system for diffraction-aware NLOS SSL, the system including a processor configured to reconstruct an indoor space; a signal collector configured to collect an audio signal from the indoor space; an acoustic ray generator configured to generate acoustic rays in the indoor space based on the audio signal; and a position estimator configured to estimate a position of an NLOS sound source based on a point at which one of the acoustic rays is diffracted.

According to some example embodiments, a sound source localization (SSL) system may further accurately estimate a position of a sound source in an indoor space. Here, the SSL system may localize a position of the sound source regardless of a presence of an obstacle between the sound source and the SSL system. That is, the SSL system may estimate a position of a non-line of sight (NLOS) sound source by tracing diffractions of acoustic rays in the indoor space.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
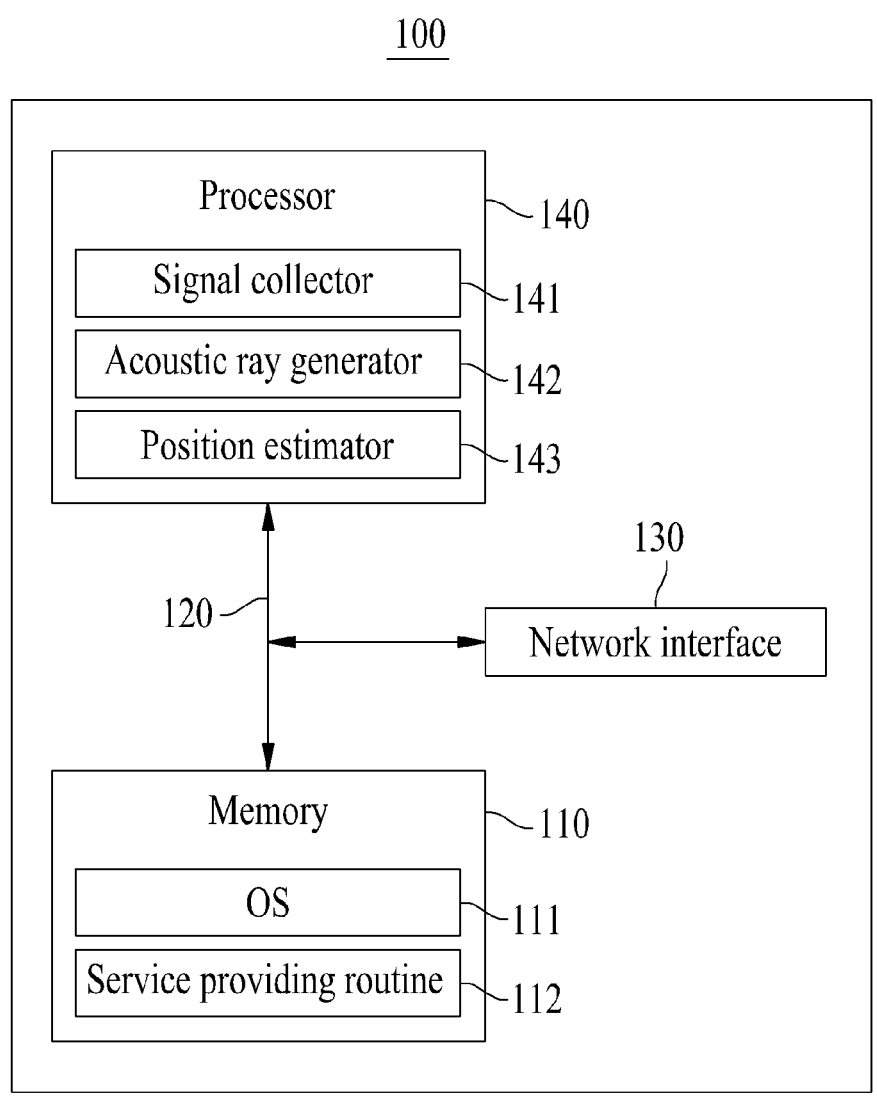
FIG. 1 is a block diagram illustrating a configuration of a sound source localization (SSL) system through reflection awareness according to example embodiments.

Hereinafter, example embodiments will be described with reference to the accompanying drawings.

The example embodiments and terminologies used herein should not be construed as being limited to only particular implementations and should be understood to include various modifications, equivalents, and/or substitutes thereof. Unless otherwise noted, like reference characters denote like elements throughout the attached drawings and written description, and thus descriptions will not be repeated. As used herein, the singular forms "a", "an", and "the", are intended to include the plural forms as well, unless the context clearly indicates otherwise. It will be further understood that the terms "A or B", "at least one of A and/or B", "A, B, or C", or "at least one of A, B and/or C", include any and all combinations of one or more of the associated listed items. Also, although the terms "first", "second", etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. When a component, for example, a first component, is "(functionally or communicably) connected" or "coupled to" another component, for example, a second component, the component may be directly connected to the other component or may be connected to the other component through still another component, for example, a third component.

The term "module" used herein may include a unit including hardware, software, or firmware, and may be interchangeably used with the terms, logic, logic block, part, circuit, etc. The module may be an integrated part, a minimum entity of performing one or more functions, or a portion thereof. For example, the module may be configured as an application-specific integrated circuit (ASIC).

The example embodiments relate to technology for reflection-aware sound source/sound localization, and more particularly, to technology for consecutively detecting an intermittent sound source occurring in a single frame and estimating, that is, localizing a three-dimensional (3D) position of a sound source considering indirect sound as well as direct sound. For example, the example embodiments relate to technology for estimating a 3D position of a sound source in a 3D scene representing an indoor space, that is, a specific scene captured from a 3D video, by tracing a propagation and reflection path of an audio signal received through a microphone array of a robot.

In the example embodiments, a direct acoustic ray may represent an audio signal generated in such a manner that a sound source, such as speech of a human and a footstep, is not blocked with an obstacle and is directly input to a microphone array of an SSL system, i.e., a measurement device.

In the example embodiments, an indirect acoustic ray may represent an audio signal generated in such a manner that a sound source, such as speech of a human and a footstep, is blocked with an obstacle, such as walls and ceiling of an indoor space, and is diffracted, absorbed, and reflected by the obstacle and thereby input to a microphone array of an SSL system.

FIG. 1 is a block diagram illustrating a configuration of an SSL system through reflection awareness according to example embodiments.

Referring to FIG. 1, an SSL system 100 according to example embodiments may include a memory 110, a bus 120, a network interface 130, and a processor 140. The memory 110 may include an operating system (OS) 111 and a service providing routine 112. The processor 140 may include a signal collector 141, an acoustic ray generator 142, and a position estimator 143. In some example embodiments, the SSL system 100 may include a more number of components than a number of components shown in FIG. 1. However, there is no need to clearly illustrate many components according to the related art. For example, the SSL system 100 may further include at least one another component, such as a display or a transceiver.

The memory 110 may include a permanent mass storage device, such as random access memory (RAM), read only memory (ROM), and a disc drive, as non-transitory computer-readable record media. Also, a program code for the OS 111 and the service providing routine 112 may be stored in the memory 110. Such software components may be loaded from another computer-readable record media separate from the memory 110 using a drive mechanism (not shown). The other computer-readable record media may include, for example, a floppy drive, a disc, a tape, a DVD/CD-ROM drive, and a memory card. According to other example embodiments, software components may be loaded to the memory 110 through the network interface 130 instead of using the computer-readable record media.

The bus 120 enables communication and data transmission between components of the SSL system 100. The bus 120 may be configured using a high-speed serial bus, a parallel bus, a storage area network (SAN) and/or another appropriate communication technology.

The network interface 130 may be a computer hardware component for connecting the SSL system 100 to a computer network. The network interface 130 may connect the SSL system 100 to the computer network through a wireless or wired connection.

The processor 140 may be configured to process an instruction of the computer program by performing basic arithmetic operations, logic operations, and input/output (I/O) operations of the SSL system 100. The instruction may be provided from the memory 110 or the network interface 130 to the processor 140 through the bus 120. The processor 140 may be configured to execute a program code for the signal collector 141, the acoustic ray generator 142, and the position estimator 143. The program code may be store in a recording device, such as the memory 110. The signal collector 141 may collect an audio signal from an indoor space. The acoustic ray generator 142 may generate acoustic rays into the indoor space based on the audio signal. The position estimator 143 may estimate a position of a sound source by tracing the acoustic rays.

Figure 2A:
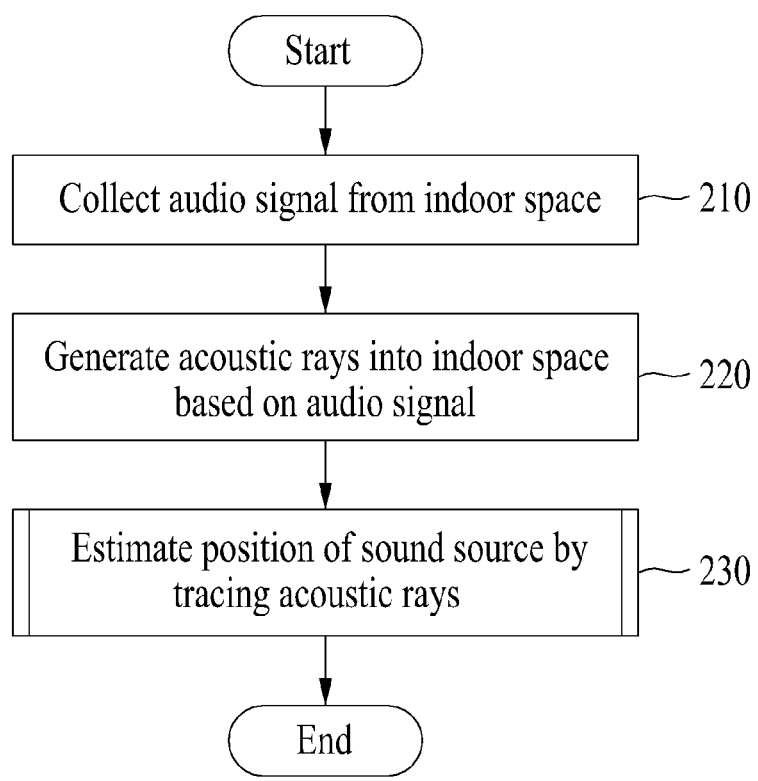
FIG. 2A is a flowchart illustrating a method for reflection-aware SSL according to example embodiments.

FIG. 2A is a flowchart illustrating a method for reflection-aware sound source position localization (SSL) according to example embodiments.

Referring to FIG. 2A, in operation 210, the SSL system 100 may collect an audio signal from an indoor space. The signal collector 141 may collect an audio signal input through a microphone array disposed in the indoor space. For example, the indoor space may include an object, for example, an acoustic material, that diffuses and reflects an acoustic signal through walls and ceiling. For example, the signal collector 141 may collect direct sound and indirect sound, that is, an acoustic signal output from the sound source and reflected, in a 3D scene that is captured through the microphone array of the SSL system 100, for example, a robot. Here, a clapping sound may be used as an original acoustic signal output from the sound source.

In operation 220, the SSL system 100 may generate acoustic rays into the indoor space based on the audio signal. The acoustic ray generator 142 may generate the acoustic rays through reflection-aware acoustic ray tracing. For example, to model specular reflection based on all of the direct sound output from the sound source and the indirect sound caused by reflection of the walls and ceiling, the acoustic ray generator 142 may reconstruct an indoor environment into a triangle-based 3D mesh map and then generate an acoustic ray for verifying a path, through which an acoustic signal propagates, that is, is transmitted by applying reflection-aware acoustic ray tracing, particularly, backward-acoustic ray tracing. For example, the acoustic ray generator 142 may measure a direction, a magnitude, and a frequency of an audio signal based on a time difference of arrival (TDOA) algorithm. The acoustic ray generator 142 may generate acoustic rays based on the direction, the magnitude, and the frequency of the audio signal. For example, the acoustic ray generator 142 may generate acoustic rays into a backward direction relative to a direction of the audio signal.

In operation 230, the SSL system 100 may estimate a position of the sound source by tracing the acoustic rays. The position estimator 143 may estimate a 3D position of the sound source based on the acoustic rays. For example, when the acoustic rays are generated by reconstructing the indoor environment into the triangle-based 3D mesh map, it may be assumed that paths, that is, acoustic propagation paths for transmitting acoustic signals are propagated from a single sound source. In this case, a position (also, referred to as a convergence position) at which the corresponding paths converge may be determined as a position of the sound source. The position estimator 143 may localize the convergence position, that is, a convergence point using a Monte-Carlo localization algorithm. A convergence point of each of the acoustic propagation paths, that is, a convergence point of an acoustic ray corresponding to each acoustic path may represent a specific point on a 3D space that is represented as a triangle-based mesh map.

Figure 2B:
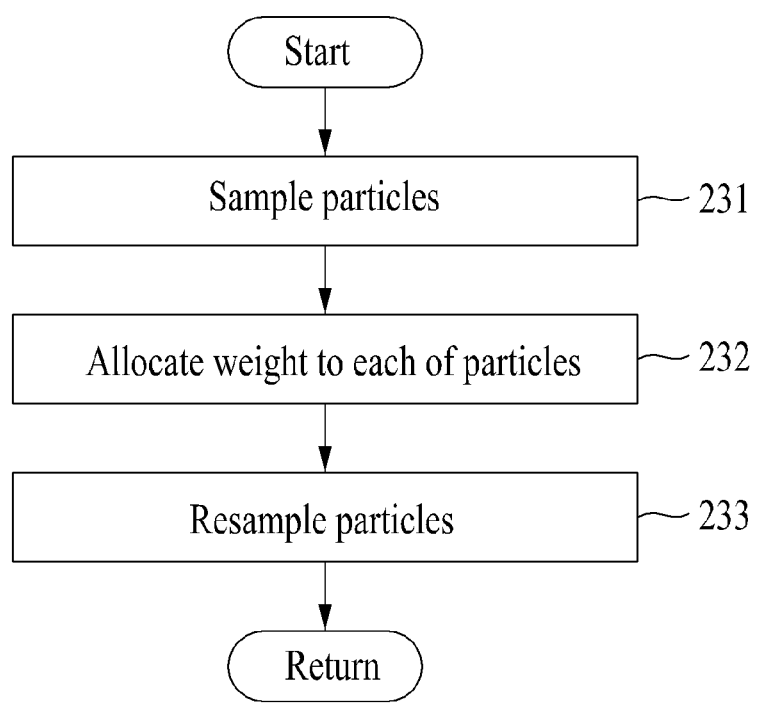
FIG. 2B is a flowchart illustrating a sound source position estimation operation of FIG. 2A.

FIG. 2B is a flowchart illustrating a sound source position estimation operation of FIG. 2A.

Referring to FIG. 2B, in operation 231, the SSL system 100 may sample a plurality of particles with respect to an acoustic path corresponding to each of the acoustic rays. The position estimator 143 may perform sampling such that the plurality of particles may be included in a single set with respect to an acoustic path corresponding to each of the acoustic rays, through reflection-aware acoustic ray tracing.

In operation 232, the SSL system 100 may allocate a weight to each of the particles. The position estimator 143 may allocate a relatively higher weight to a particle that is closer to a specific acoustic ray, with respect to the particles.

In operation 233, the SSL system 100 may resample the particles based on the weight allocated to each of the particles. The position estimator 143 may perform resampling of removing a particle of which a weight is less than a predetermined reference weight, based on the weights allocated to the respective particles. Once resampling is completed, the position estimator 143 may compute a generalized variance (GV) that is a one-dimensional measure for multi-dimensional scatter data. If the computed GV is less than a predetermined convergence threshold, a mean position of the particles may be determined, that is, estimated as a position of the sound source.

Figure 3:
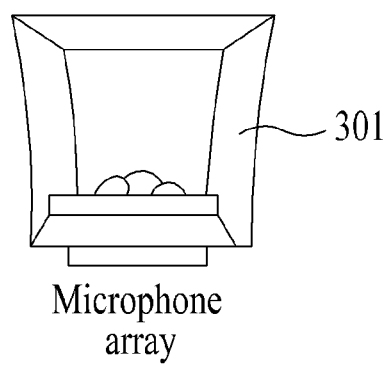
FIG. 3 illustrates an example of a microphone array outputting sound signal from a sound source according to example embodiments.

FIG. 3 illustrates an example of a microphone array outputting sound signal from a sound source according to example embodiments.

Referring to FIG. 3, the SSL system 100, for example, a robot, may collect indirect sound and direct sound output from a sound source through a microphone array 301. For example, the microphone array 301 may include a cube-shaped microphone array. Once the direct sound and the indirect sound are collected, the acoustic ray generator 142 may measure a direction, a magnitude, and a frequency of an audio signal based on a TDOA algorithm with respect to the audio signal, that is, an acoustic signal, corresponding to the collected direct sound and indirect sound. The acoustic ray generator 142 may generate acoustic rays based on the measured direction, magnitude, and frequency of the audio signal, using reflection-aware acoustic ray tracing. Here, to generate a further accurate acoustic ray, decrease of energy and error correction of map information may be performed according to propagation of the audio signal and all of operations may be performed in real time. To perform the reflection-aware acoustic ray tracing, 3D space information is required. The reflection-aware acoustic ray tracing may be applied based on a triangle-based mesh map generated in a simultaneous localization and mapping (SLAM) module and a position of the SSL system 100, for example, the robot. For example, the mesh map may include at least one mesh element. Here, the reflection-aware acoustic ray tracing corresponds to backward acoustic ray tracking, and the acoustic ray generator 142 may generate an acoustic ray in a backward direction by reversing a direction of the audio signal based on the measured direction of the audio signal. In this case, a 3D position of the sound source may be determined by computing a point at which acoustic propagation paths corresponding to the respective acoustic rays, that is, acoustic propagation paths corresponding to reflection acoustic signals and acoustic propagation paths corresponding to the direct sound converge.

The following Table 1 may represent notations used for the following equations to estimate/trace a position of a sound source.

TABLE 1

| Symbol | Description |
| --- | --- |
| $\dot{o}_m$ | The position of the microphone array. |
| $(\hat{v}_n, f_n, i_n^k)$ | An incoming direction, frequency and initial energy of the n-th sound signal, respectively. |
| N | The number of sound signals at current time frame. |
| $R_n, r_n^k, \hat{d}_n$ | A ray path traced from n-th sound signal, and its k-th order reflected ray with its directional unit vector. |
| $I_n^k(l')$ | An energy of the sound ray $r_n^k$ at $l = l'$. |

TABLE 1-continued

| Symbol | Description |
|---|---|
| $\alpha(f_n)$, $\alpha_s(f_n)$ | Attenuation coeff. of the air, and absorption coeff. of the reflection. |
| $\dot{p}_{hit}$, $p_{local}$ | A voxel that is hit by a ray, and its local, occupied voxels. |
| $\hat{n}$ | A normal vector of a surface locally fit at $\dot{p}_{hit}$. |
| $X_t$, $x_t^i$ | A set of W particles, and its i-th particle at iteration t. |

Hereinafter, an operation of generating and tracing an acoustic propagation path, that is, an acoustic ray while processing the direct sound output from the sound source and the reflection indirect sound using reflection-aware acoustic ray tracing is further described.

Figure 4:
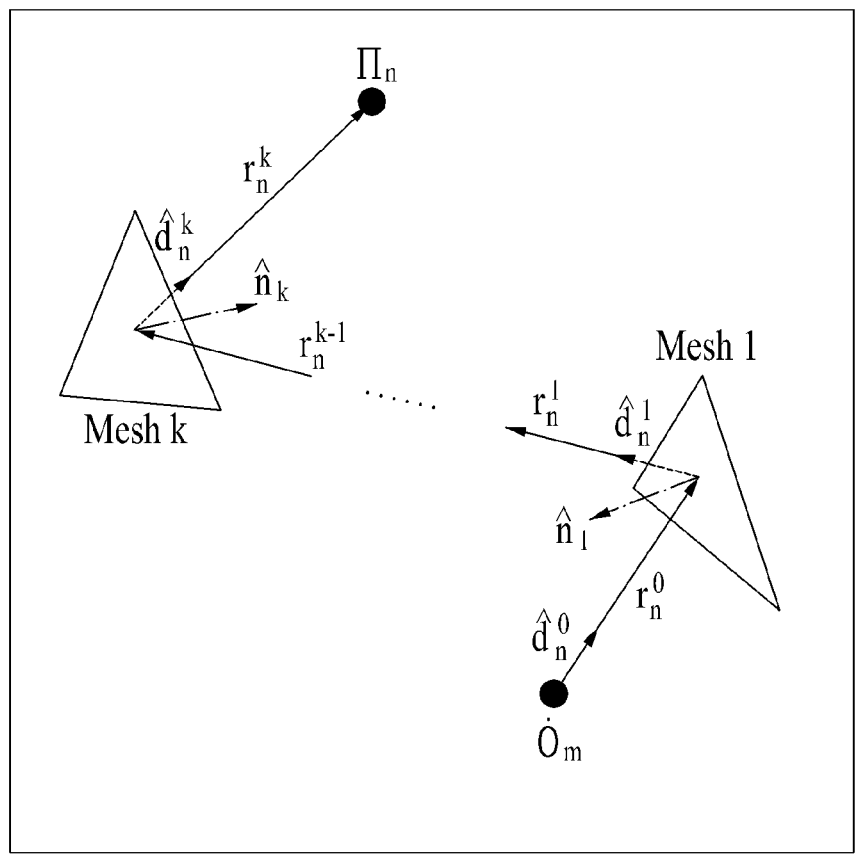
FIG. 4 illustrates an example of generating and tracing an acoustic ray according to example embodiments.

FIG. 4 illustrates an example of generating and tracing an acoustic ray according to example embodiments.

As described above with reference to FIG. 3, a direction of a received audio signal needs to be known to generate an acoustic propagation path corresponding to an acoustic ray in a reconstructed 3D scene. Here, a TDOA-based sound source localization (SSL) algorithm may be used to compute the direction.

The acoustic ray generator 142 may execute a TDOA module configured to disperse an initially captured audio signal into N received signals for each invocation. Here, an $n^{th}$ received audio signal may be represented as tuple ($\hat{v}_n$, $f_n$, $i_n^0$). Here, unit vector $\hat{v}_n$ denotes a direction in which the audio signal is received, $f_n$ denotes a representative frequency that represents highest energy of the received audio signal, and $i_n^0$ denotes an energy value corresponding to pressure of the audio signal collected by a microphone array. The acoustic ray generator 142 may generate an acoustic ray $r_n^0$ based on the direction, the frequency, and the magnitude (that is, energy value) of the collected audio signal and a parametric equation with a ray length $l>0$. That is, the acoustic ray $r_n^0$ generated based on the tuple ($\hat{v}_n$, $f_n$, $i_n^0$) and the parametric equation may be represented as the following [Equation 1].

$$r_n^0(l) = \hat{d}_n^0 \cdot l + \dot{o}_m \quad \text{[Equation 1]}$$

In Equation 1, $\dot{o}_m$ denotes a starting point of the microphone array and $\hat{d}_n^0$ denotes a unit vector that represents a directivity of an audio signal of which a direction is reversed with respect to the received audio signal. That is, $\hat{d}_n^0$ may correspond to $\hat{d}_n^0 = -\hat{v}_n$ as the directional unit vector of which the direction is reversed relative to the direction of the audio signal received through the microphone array. A superscript k of the acoustic ray denotes a number of reflections or reflection order reflected along an acoustic propagation path from the microphone array. For example, $r_n^0(1)$ denotes an acoustic ray corresponding to direct sound directly received from the microphone array without reflection and may be represented as a direct ray since there is no reflection. Also, 1 denotes a length of the acoustic ray. Various numbers of reflections, that is, all of the acoustic rays corresponding to k≥1 may be represented as an indirect acoustic ray as an acoustic ray corresponding to the indirect sound having k-order reflection. As described above, when the acoustic ray is generated, the generated acoustic ray may correspond to a ray that propagates in the 3D space and is blocked with and thereby reflected by an obstacle. Energy of the acoustic ray may be amplified to trace the propagated and reflection acoustic ray.

If the generated acoustic ray $r_n^k$ is blocked with an obstacle, for example, the walls and ceiling included in the 3D scene, reflection, absorption, or diffraction may occur based on a type of the blocked surface. Here, with the assumption that a high frequency audio signal of 2 kilohertz (kHz) or higher is a sound source and absorption and reflection are supported, a position of the sound source may be estimated. That is, with the assumption that a reflective and diffuse acoustic material is present, a reflection acoustic ray, that is, a specular acoustic material is present, the reflection acoustic ray, that is, the specular acoustic ray may be generated. In the case of diffuse reflection, an expensive backward simulation method, such as Monte-Carlo simulation, unsuitable for a real-time robot application is required. Also, while many diffuse materials are present in an indoor space, such as a room, each individual audio signal reflected by a diffuse material may not convey a high energy portion of an audio signal generated from the sound source. That is, in the case of selecting TDOA-based high energy directional data, many audio signals reflected by the diffuse material are automatically ignored and many signals having high energy are generated due to a specular material. Accordingly, a 3D position of the sound source may be accurately estimated considering only the specular reflection without considering the diffuse reflection.

All of the materials, for example, obstacles present within the indoor space do not need to be specular materials. When some materials exhibit a high energy reflection rate around a specular direction, such as a texture material of the ceiling, the corresponding direction may be determined as a direction in which an acoustic ray towards the corresponding direction is generated and a position of the sound source of rays may be identified. Accordingly, reflection may be determined to have occurred due to the obstacle with which the acoustic ray is blocked and the reflection ray may be generated at a corresponding blocked point. Here, a previous acoustic ray $r_n^k$ and a new reflection acoustic ray $r_n^{k+1}$ may be generated using a direction every time block with the surface of the obstacle occurs in a specific ray length. While generating an acoustic ray corresponding to an acoustic propagation path, a sequence $R_n = [r_n^0, r_n^1, \ldots]$ representing an acoustic ray corresponding to an $n^{th}$ audio signal among audio signals may be maintained. A position of the sound source may be estimated based on the sequence $R_n = [r_n^0, r_n^1, \ldots]$.

Figure 5:
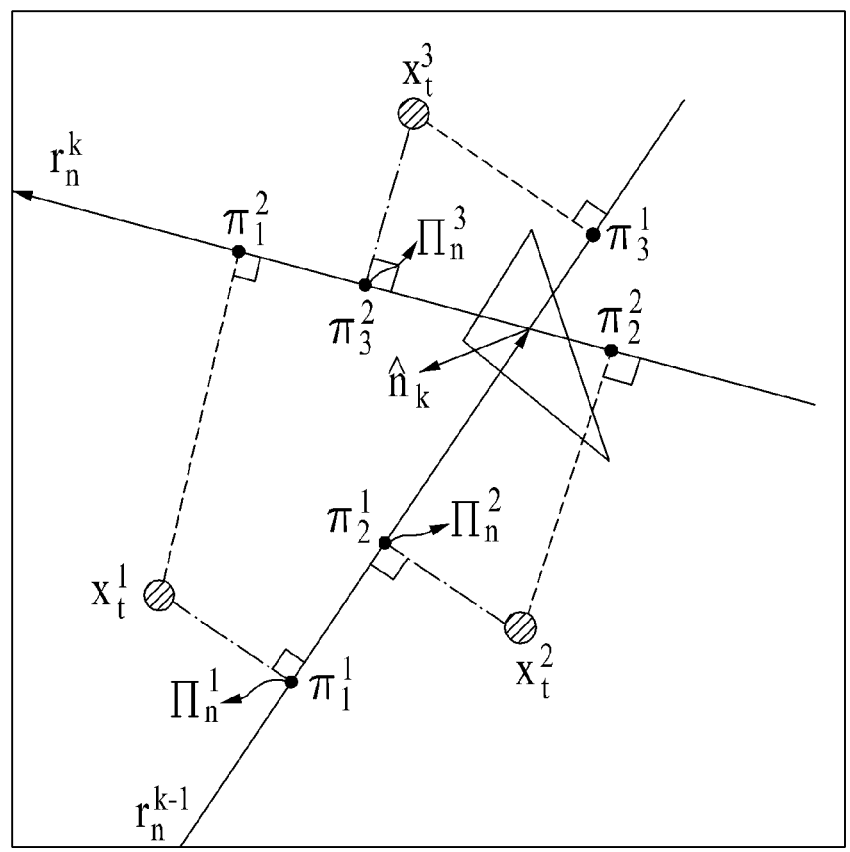
FIG. 5 illustrates an example of allocating a weight with respect to particles corresponding to an acoustic ray of an acoustic propagation path according to example embodiments.

FIG. 5 illustrates an example of allocating a weight with respect to particles corresponding to an acoustic ray of an acoustic propagation path according to example embodiments.

With respect to a signal collected through a microphone array, an acoustic ray, that is, a direct acoustic ray and a reflection acoustic ray, corresponding to direct sound and indirect sound, that is, a reflection audio signal may be generated and a position of a sound source in a 3D space may be estimated based on an acoustic propagation path corresponding to the generated acoustic ray. Here, for clarity, all of the audio signals may be assumed to be output from a single sound source. A point at which acoustic rays intersect may be localized and may be determined as a position of the sound source. However, in an actual environment, noise is present in each signal due to various sensors that collect audio and video signals, such as a microphone and Kinect. Accordingly, a point at which many acoustic rays converge may be localized and determined as the position of the sound source, instead of simply using the intersection point. That is, a convergence region may be localized and when the localized convergence region is sufficiently small to be less than or equal to a reference region, the position of the sound source may be determined by processing the corresponding convergence region as a region in which the sound source is present. For example, the position estimator 143 may determine a convergence position using a particle-based Monte-Carlo localization method. Here, sampling, weight computation, and resampling may be performed to determine the convergence position.

The position estimator 143 may perform sampling with respect to acoustic rays corresponding to the generated N acoustic propagation paths $\{R_1, \ldots, R_N\}$. In each sampling iteration step t, W particle sets $\chi_t=\{x_t^1, \ldots, x_t^W\}$ are present and the particle set may be used as a virtual position of the sound source and may randomly spread at an initial step of the 3D space. For example, the position estimator 143 may encode information regarding how close a specific particle is located to an acoustic ray around the particle with respect to a plurality of particles. Here, to acquire a high level of accuracy, a more number of particles close to the acoustic ray may be generated. At each iteration t aside from the initial iteration, a new particle set $\chi_{i+1}$ may be gradually generated from previous particles. For example, a new particle $x_{i+1}$ may be generated by offsetting a previous particle $x_t^i$ to offset d in a random unit direction $\hat{u}$, represented by [Equation 2] and [Equation 3].

$$x_{t+1}^j = x_t^j + d \cdot \hat{u} \qquad \text{[Equation 2]}$$

$$d = \|x_{t+1}^j - x_t^j\| \sim N(0, \sigma_t) \qquad \text{[Equation 3]}$$

Here, $N(\cdot)$ denotes a normalization distribution with the mean of zero, and a standard deviation may be determined based on a size of an environment. If the indoor space is a room with the size of 7 m×7 m, 1 m may be set as variance $\sigma_t$.

Referring to FIG. 5, for example, the position estimator 143 may compute a likelihood of an $i^{th}$ particle belonging to an acoustic ray. Here, the position estimator 143 may allocate a weight to each particle belonging to the acoustic ray by allocating a relatively high weight to a specific particle that is closer to the acoustic ray than other particles. Here, the likelihood $P(o_t|x_t^i)$ may be represented based on the acoustic propagation path $o_t=[R_1, R_2, \ldots, R_N]$ as the following [Equation 4].

$$P(o_t | x_t^i) = \frac{1}{n_c} \sum_{n=1}^{N} \left\{ \max_k w(x_t^i, r_n^k) \right\} \qquad \text{[Equation 4]}$$

In Equation 4, a weight function w may be defined between the particle $x_t^i$ and the acoustic ray $r_n^k$. Also, $1/n_c$ and a k-order reflection acoustic ray of an $n^{th}$ acoustic propagation path $R_n$ may represent a normalization factor for the likelihood of all of the particles. That is, a maximum weight among weights computed based on an acoustic ray to which a corresponding particle belongs may be determined as a representative weight for each particle and all of the acoustic propagation paths and the representative weight may be accumulated.

For example, referring to FIG. 5, if two acoustic rays $r_n^1$ and $r_n^2$ corresponding to the acoustic propagation path $R_n$ are present, and if the particle $x_t^1$ is closer to the acoustic ray $r_n^2$ than the acoustic ray $r_n^1$ in the acoustic propagation path $R_n$, $w(x_t^1, r_n^2)$ may be allocated as a representative weight of the acoustic propagation path $R_n$ based on the acoustic ray $r_n^2$. The weight function $w(x_t^i, r_n^k)$ may be represented as the following [Equation 5].

$$w(x_t^i, r_n^k) = f_N(\|x_t^i - \pi_t^k\| | 0, \sigma_w) \times F(x_t^i, r_n^k) \qquad \text{[Equation 5]}$$

In Equation 5, $\pi(x_t^i, r_n^k)$ returns a foot, that is, a point perpendicular to the particle $x_t^i$ with respect to the acoustic ray $r_n^k$ and $f_N(\cdot)$ denotes a probability density function (p.d.f.) of the normal distribution. $\sigma_w$ may be set according to a determinant of a covariance matrix of particles. Accordingly, other particles are further distributed and a relatively high weight may be allocated to a particle that is close to the acoustic ray. To exclude an irrelevant case, F denotes a filter function that returns zero if the perpendicular foot is outside the acoustic ray $r_n^k$, for example, in the case of $\pi_2^1$ of FIG. 5, and otherwise, returns 1.

As described above, when a weight is allocated to each of sampled particles $P(o_t|x_t^i)$, the allocated weight may be used to find, that is, compute an updated particle set in a subsequent step t+1. Here, a particle having a relatively low weight, that is, a weight less than a predetermined reference weight may be removed. In this case, a new particle may be additionally generated around a particle to which a weight greater than the reference weight is allocated. As described above, during a process of generating a new particle around an existing particle, that is, a particle in the step t, in the subsequent step t+1, resampling of removing a particle having a weight less than the reference weight may be performed.

Once resampling is completed, the position estimator 143 may verify whether a number of the resampled particles has sufficiently converged to define the estimated source. For example, the position estimator 143 may compute a GV that is a one-dimensional measure for multi-dimensional scatter. The position estimator 143 may estimate a position of the sound source based on the computed GV and a predetermined convergence threshold. For example, if the computed GV is less than $\sigma_c=0.01$, the position estimator 143 may estimate a mean position of particles as the position of the sound source. The GV may be used as a measure for the estimation and may be used as a covariance matrix that illustrates a 95% confidence ellipse disc to visualize a region corresponding to the estimated position of the sound source.

According to example embodiments, a 3D position of a sound source, that is, an audio signal may be further accurately estimated in an indoor space by consecutively detecting an intermittent sound source occurring in a single frame based on direct sound output from the sound source and indirect sound reflected by an object, such as walls and ceiling. Also, by accurately estimating a 3D position of a corresponding sound source from sound, for example, speech and footstep, of an object, for example, a thing and a person, present around, for example, a robot, the robot may further accurately determine a specific person that is speaking when the specific person is conversing with the robot in an indoor environment in which a plurality of persons is present. In addition, in a region in which a visual sensor, for example, a camera, a red, green, blue (RGB)-D camera, and a laser scanner, of the robot does not properly function, a position of specific sound may be traced.

A sound source may not be directly in line of sight of a listener and be occluded by an obstacle. In this case, there may not be much contribution in terms of direct sound and methods based on TDOA may not effectively work. Accordingly, indirect sound effects may need to be modeled and a most widely used method is based on a method of molding propagation of sound waves as ray-based geometric propagation paths. The method assumes rectilinear propagation of sound waves and uses ray tracking to compute higher order reflections. The method works well for high frequency sounds, however, does not model a low frequency phenomenon such as diffraction that is a type of scattering that occurs from obstacles of which size is of the same order of magnitude as the wavelength. In practice, diffraction is a fundamental mode of sound wave propagation and frequently occurs in a building interior, for example, in a case in which a source is behind an obstacle or hidden by walls. This is more prominent for low-frequency sources, for example, vowel sounds in human speech, industrial machinery, ventilation, and an air-conditioning device.

Accordingly, the example embodiments relate to technology for diffraction-aware non-line of sight (NLOS) sound source localization (SSL), and more particularly, to technology for tracing, that is, localizing a position of an NLOS sound source based on diffraction effects, particularly, from an NLOS sound source. For example, the example embodiments relate to technology for localizing a position of an NLOS sound source by employing, as the ray tracing, a uniform theory of diffraction (UTD), which may apply to localizing a position of a dynamic NLOS sound source as well as a position of a static NLOS sound source.

Figure 6:
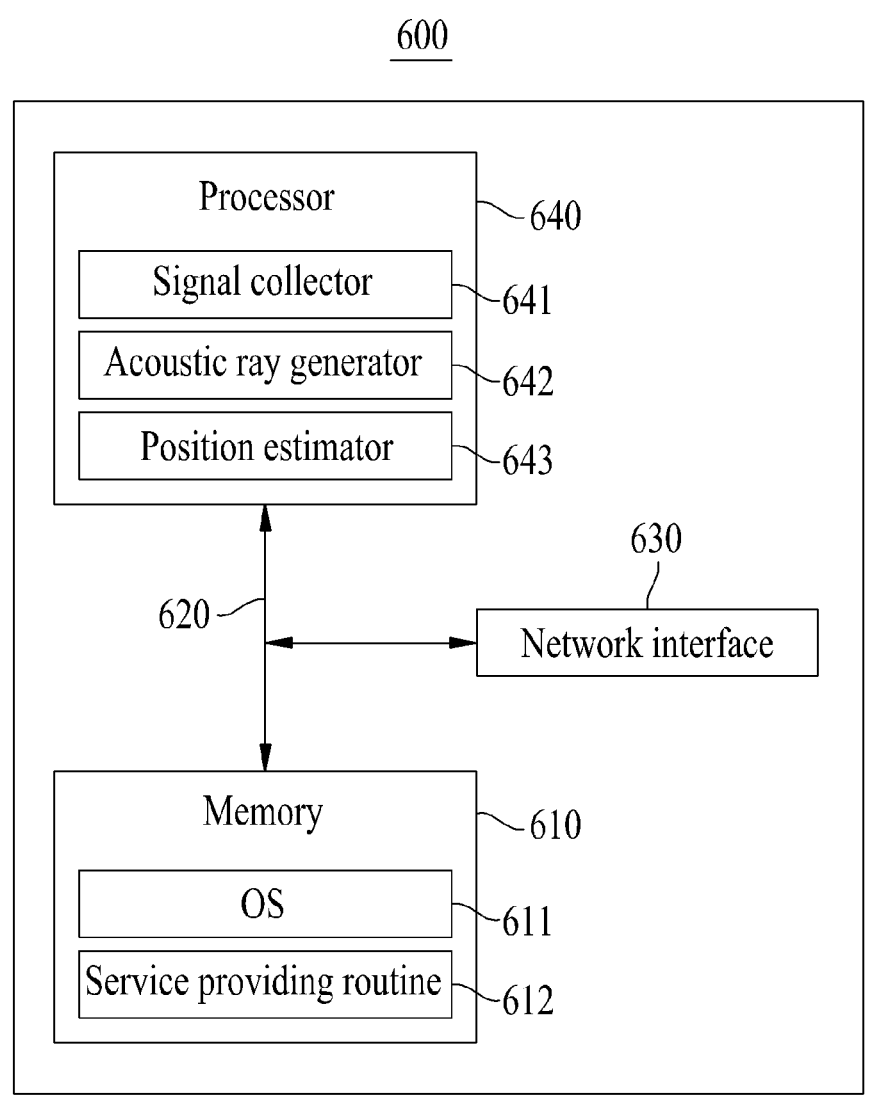
FIG. 6 is a block diagram illustrating a configuration of a non-line of sight (NLOS) SSL system through diffraction awareness according to example embodiments.

FIG. 6 is a block diagram illustrating a configuration of an NLOS SSL system through diffraction awareness according to example embodiments.

Referring to FIG. 6, an SSL system 600 may include a memory 610, a bus 620, a network interface 630, and a processor 640. The memory 610 may include an OS 611 and a service providing routine 612. The processor 640 may include a signal collector 641, an acoustic ray generator 642, and a position estimator 643. In some example embodiments, the SSL system 600 may include a more number of components than a number of components shown in FIG. 6. However, there is no need to clearly illustrate many components according to the related art. For example, the SSL system 600 may further include at least one another component, such as a display or a transceiver. Here, the components of the SSL system 600 of FIG. 6 may be the same or similar to those of the SSL system 100 of FIG. 1. A further description related thereto is omitted.

Figure 7A:
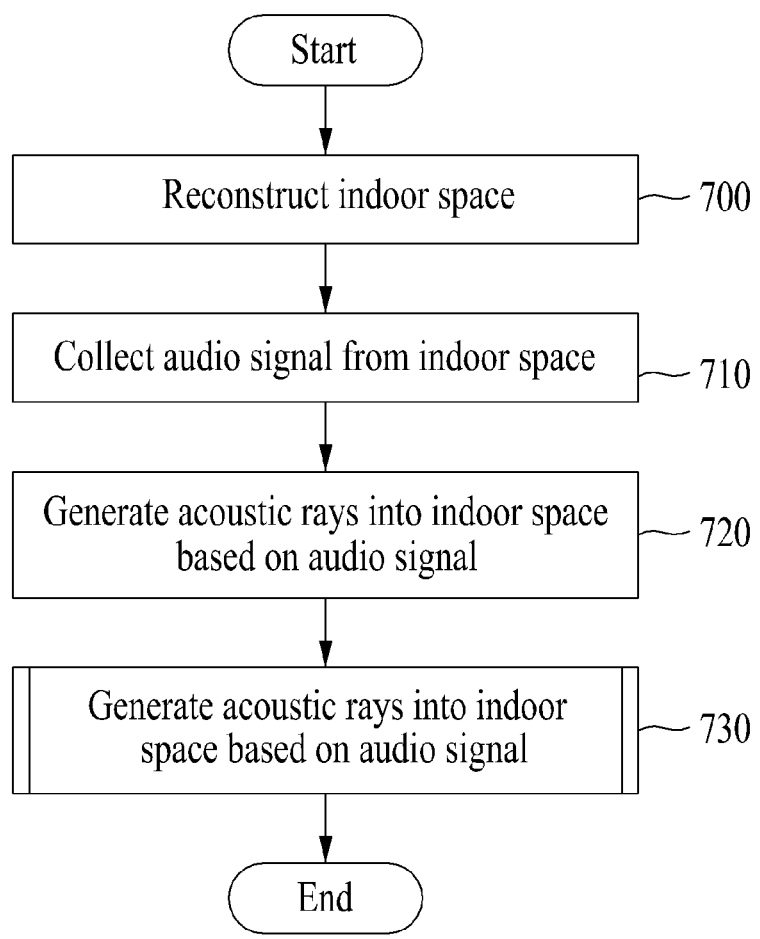
FIG. 7A is a flowchart illustrating a method for diffraction-aware NLOS SSL according to example embodiments.

FIG. 7A is a flowchart illustrating a method for diffraction-aware NLOS SSL according to example embodiments.

Referring to FIG. 7A, in operation 700, the SSL system 600 may reconstruct an indoor space. The SSL system 600 may reconstruct the indoor space as a 3D model. The processor 640 may reconstruct the indoor space using a plurality of mesh elements and at least one wedge. The processor 640 may reconstruct the mesh elements and may extract a wedge from between two of the mesh elements. For example, if an angle between two of the mesh elements is less than a predetermined angle, the processor 640 may extract a wedge.

In operation 710, the SSL system 600 may collect an audio signal from the indoor space. The signal collector 641 may collect an audio signal input through a microphone array provided in the indoor space. Here, the audio signal may be output from an NLOS sound source.

In operation 720, the SSL system 600 may generate acoustic rays into the indoor space based on the audio signal. For example, the acoustic ray generator 642 may measure at least one of a direction, a magnitude, and a frequency of the audio signal based on a TDOA algorithm. The acoustic ray generator 642 may generate the acoustic rays based on the measured direction, magnitude, and frequency of the audio signal. For example, the acoustic ray generator 642 may generate the acoustic rays in a backward direction relative to a direction of the audio signal. Accordingly, the acoustic rays may progress to be close to an NLOS sound source at a relatively high probability.

In operation 730, the SSL system 600 may estimate a position of the NLOS sound source by tracing the acoustic rays. The SSL system 600 may estimate a point at which one of the acoustic rays is diffracted as the position of the NLOS sound source. If at least one of the acoustic rays is diffracted in a neighboring region of the wedge, the position estimator 643 may estimate the position of the NLOS position based on a position of the wedge. If at least one of the acoustic rays is reflected by the mesh element, the position estimator 643 may estimate the position of the NLOS position based on a position at which the reflection acoustic ray converges. That is, the position estimator 643 may estimate the position of the NLOS sound source based a position at which the diffraction acoustic ray and the reflection acoustic ray converge. For example, the position estimator 643 may localize the convergence position, that is, convergence point using a Monte-Carlo localization algorithm with respect to acoustic signals.

Figure 7B:
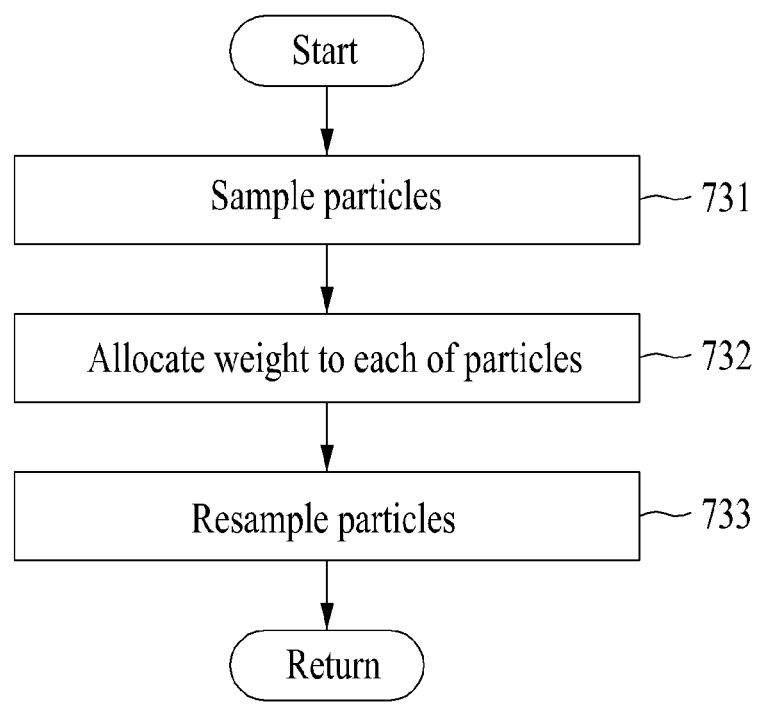
FIG. 7B is a flowchart illustrating an NLOS sound source position estimation operation of FIG. 7A.

FIG. 7B is a flowchart illustrating an NLOS sound source position estimation operation of FIG. 7A.

Referring to FIG. 7B, in operation 731, the SSL system 600 may sample a plurality of particles with respect to an acoustic path corresponding to each of the acoustic rays. The position estimator 643 may perform sampling such that the plurality of particles may be included in a single set with respect to an acoustic path corresponding to each of the acoustic rays.

In operation 732, the SSL system 600 may allocate a weight to each of the particles. The position estimator 643 may allocate a weight based on a distance from at least one of a diffraction acoustic path or a reflection acoustic path. For example, the position estimator 643 may allocate a relatively higher weight to a particle that is closer to at least one of the diffraction acoustic path and the reflection acoustic path, with respect to the particles.

In operation 733, the SSL system 600 may resample the particles based on the weight allocated to each of the particles. The position estimator 643 may perform resampling of removing a particle of which a weight is less than a predetermined reference weight, based on the weights allocated to the respective particles. Once resampling is completed, the position estimator 643 may compute a GV that is a one-dimensional measure for multi-dimensional scatter data. If the computed GV is less than a predetermined convergence threshold, a mean position of the particles may be determined, that is, estimated as a position of the sound source.

Figure 8:
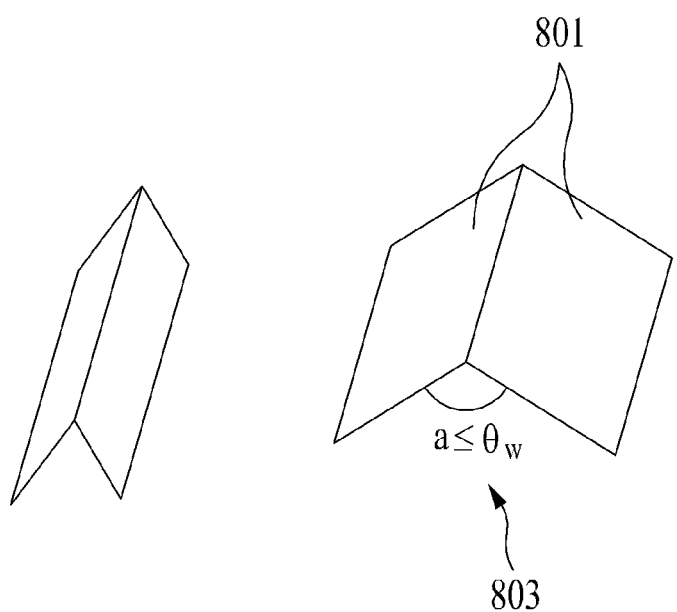
FIG. 8 illustrates an example of reconstructing a 3D model in an indoor space according to example embodiments.

FIG. 8 illustrates an example of reconstructing a 3D model in an indoor space according to example embodiments.

Referring to FIG. 8, the SSL system 600 may reconstruct an indoor environment as a 3D model. For example, the SSL system 600 may extract an RGB-D stream associated with the indoor environment through Kinect and a laser scanner, and may generate a 3D point cloud associated with the indoor environment based on the RGB-D stream and depth information detected through a SLAM module. The SSL system 600 may reconstruct the indoor environment as a triangle-based 3D mesh map from the 3D point cloud. Here, the mesh map of the indoor environment may include a plurality of mesh elements 801. The SSL system 600 may extract at least one wedge 803 from among the plurality of mesh elements 801. Here, the SSL system 600 may extract the wedge 803 from between two of the mesh elements 801.

For example, if an angle between two of the mesh elements 801 is less than a predetermined angle $\theta_w$, the SSL system 600 may extract the wedge 803. Through this, the SSL system 600 may reconstruct the indoor environment with the plurality of mesh elements 801 and the at least one wedge 803.

FIGS. 9, 10A, 10B, and 10C illustrate examples of estimating a position of an NLOS sound source according to example embodiments.

Figure 9:
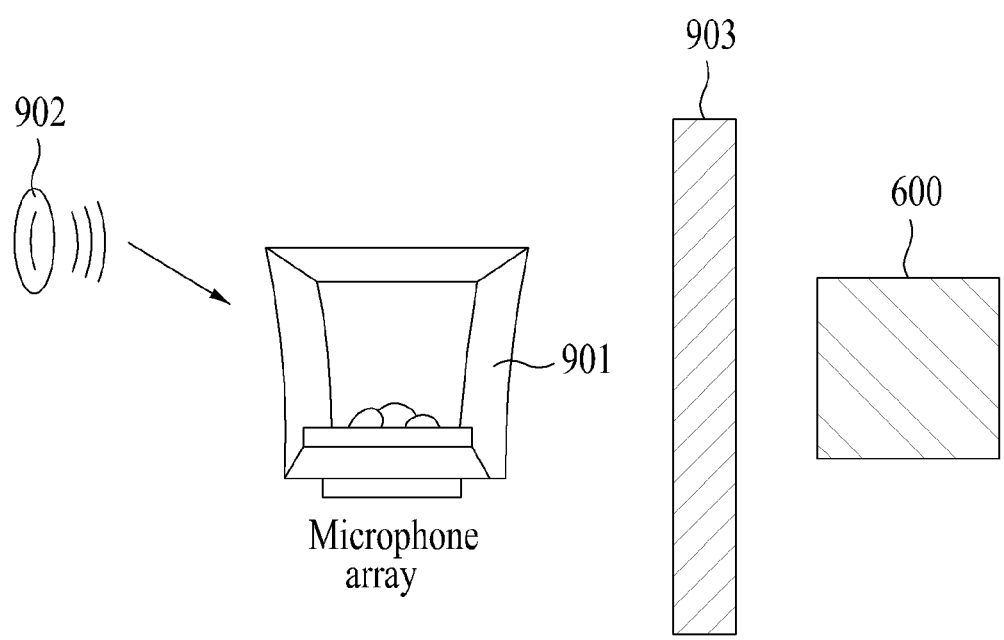
FIGS. 9, 10A, 10B, and 10C illustrate examples of estimating a position of an NLOS sound source according to example embodiments.

Referring to FIG. 9, the SSL system 600 according to example embodiment may trace, that is, localize a position of an NLOS sound source 902 based on a mesh map of an indoor space, a position of the SSL system 600 in the indoor space, and an audio signal collected from the indoor space through a microphone array 901. Here, the SSL system 600 may collect an audio signal output from the NLOS sound source 902 through the microphone array 901. Here, the audio signal may include at least one of a direct ray, a reflection ray, and a diffraction ray. For example, the microphone array 901 may include a cube-shaped microphone array. Also, in the indoor space, an obstacle 903 may be present between the SSL system 600 and the NLOS sound source 902. Here, the SSL system 600 may measure at least one of a direction, a magnitude, and a frequency of the audio signal based on a TDOA algorithm.

According to example embodiments, the SSL system 600 may generate acoustic rays into the indoor space based on the audio signal. Here, the SSL system 600 may generate the acoustic rays based on the audio signal by applying backward-acoustic ray tracing. Here, the SSL system 600 may generate the acoustic rays based on the direction, magnitude, and frequency of the audio signal. For example, the SSL system 600 may generate acoustic rays in a backward direction relative to a direction of the audio signal. The SSL system 600 may output the acoustic rays as the direct ray. Accordingly, the acoustic rays may progress to be close to the NLOS sound source 902 at a relatively high probability.

According to example embodiments, the SSL system 600 may trace acoustic rays. Here, the acoustic rays may include at least one of a direct ray, a reflection ray, and a diffraction ray. The reflection ray may be generated in such a manner that the direct ray is reflected in the indoor space and the diffraction ray may be generated in such a manner that the direct ray is diffracted in the indoor space. Here, the SSL system 600 may trace at least one of a progress path, a reflection point, and a diffraction point of each of the acoustic rays. Through this, the SSL system 600 may estimate a position of the NLOS sound source 902. The SSL system 600 may estimate the position of the NLOS sound source 902 in a neighboring region of the NLOS sound source 902. Here, the SSL system 600 may estimate the position of the NLOS sound source 902 based on a convergence position of the acoustic rays.

Figure 10A:
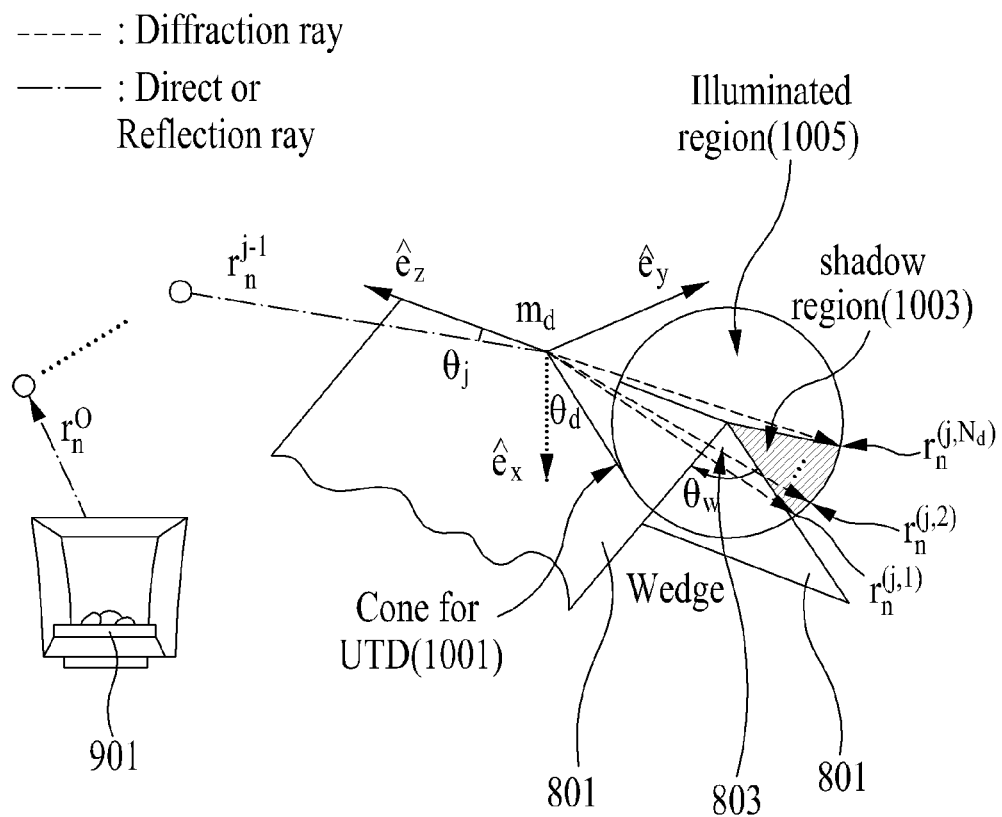

Referring to FIG. 10A, at least one of acoustic rays may be diffracted in the wedge 803 between two of the mesh elements 801. At least one of the acoustic rays may be reflected by the mesh elements 801. That is, an audio signal output from the NLOS sound source 902 may be reflected by at least one of the mesh elements 801 or diffracted by the wedge 803 and then incident to the microphone array 901. Here, according to a UTD, the wedge 803 may be assumed as a virtual sound source that generates a spherical wave.

For example, each of the acoustic rays may be represented as $R_n = [r_n^k]$. Here, n denotes an identifier of each acoustic ray and k denotes the order of progress path for each acoustic ray and may increase as each acoustic ray is reflected or diffracted. For example, an acoustic ray may be represented as $R_n = [r_n^0, r_n^1, \ldots, r_n^j]$. Here, $r_n^0$ denotes a direct ray output from the SSL system 600, and $r_n^1$ denotes a reflection ray or a diffraction ray that is output from the SSL system 600 and then primarily reflected or refracted. Here, a (j−1)-order acoustic ray is diffracted, which may generate a j-order acoustic ray, that is, $N_d$ diffraction rays.

Figure 10B:
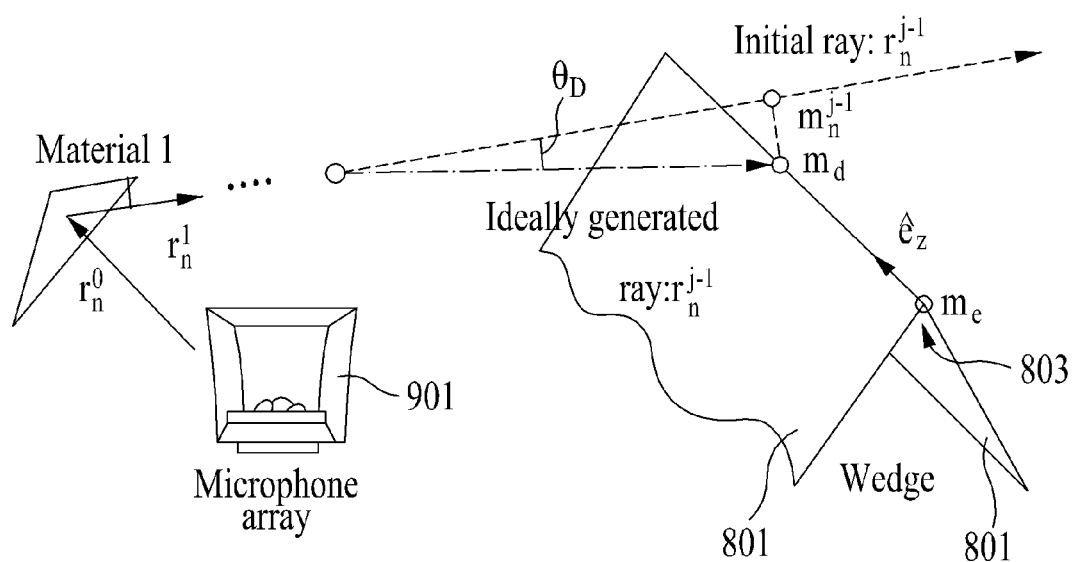

For example, the SSL system 600 may determine whether at least one of the acoustic rays is diffracted on the wedge 803 based on proximation between each of the acoustic rays and the wedge 803. The SSL system 600 may determine a diffraction rate $v_D$ of each of the acoustic rays based on an angle $\theta_D$ between each of the acoustic rays and its ideally generated ray for the diffraction with the wedge 803. For example, diffraction rate $v_D = \cos(\theta_D)$. Here, a cos function may be used to normalize the angle $\theta_D$. To this end, a point $m_d$ of a diffraction ray that is ideally generated from a (j−1)-order acoustic ray may be defined on the edge on the wedge 803, that is, between the mesh elements 801. Referring to FIG. 10B, the point $m_d$ may be located at a position closest to a point $m_n^{j-1}$ of a (j−1)-order acoustic ray. If the diffraction rate $v_D$ of the (j−1)-order acoustic ray exceeds a predetermined threshold, the (j−1)-order acoustic ray may be determined to be generated from the diffraction on the wedge 803. Accordingly, the j-order acoustic ray, that is, diffraction rays may be generated.

Figure 10C:
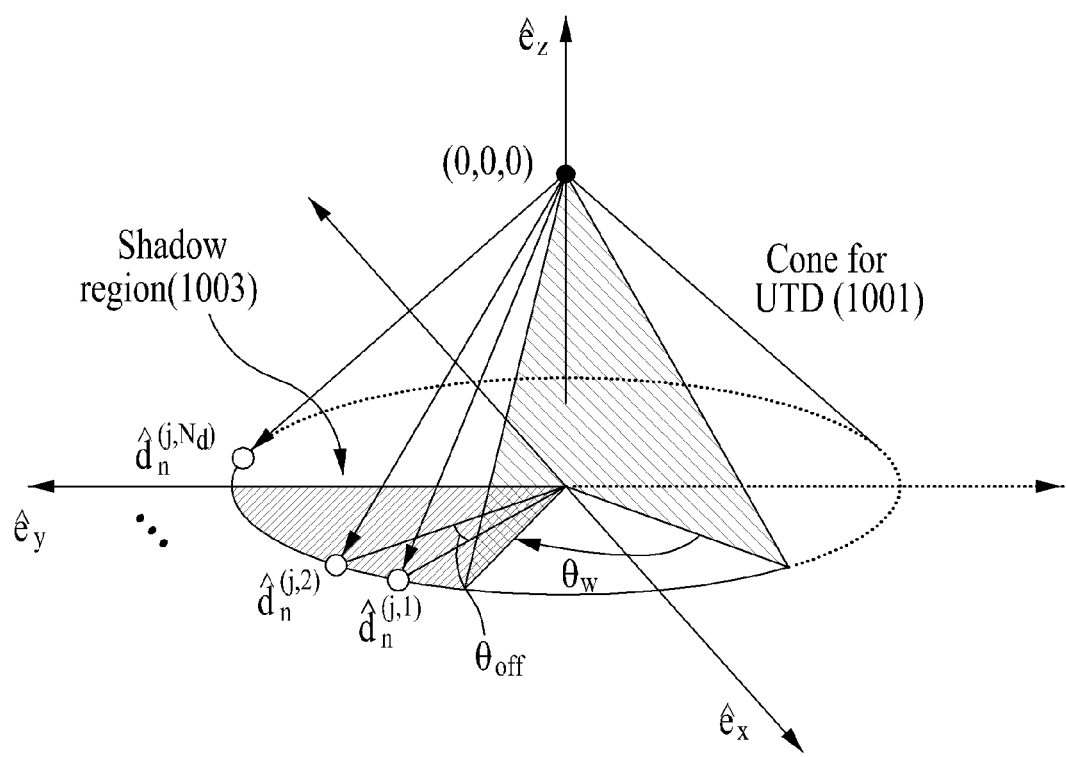

For example, the SSL system 600 may compute outgoing directions of diffraction rays. Here, since a UTD is based on the principle of Fermat, diffraction rays may be generated along the surface of a cone 1001 as shown in FIG. 10C. Here, an audio signal follows a shortest path from a sound source to a listener. Therefore, the surface of the cone 1001 for the UTD may include every set of shortest paths. Outgoing directions of the diffraction rays are unit vectors generated on the cone 1001 and may be computed on a local domain as represented by the following [Equation 6].

$$\hat{d}_n^{(j,p)} = \begin{bmatrix} \cos\left(\frac{\theta_w}{2} + p \cdot \theta_{off}\right)\sin\theta_d \\ \sin\left(\frac{\theta_w}{2} + p \cdot \theta_{off}\right)\sin\theta_d \\ -\cos\theta_d \end{bmatrix} \quad \text{[Equation 6]}$$

In Equation 6, $\hat{d}_n^{(j,p)}$ denotes a unit vector of a $p^{th}$ diffraction ray among $N_d$ diffraction rays, $\theta_w$ denotes an angle between the neighboring mesh elements 801 of the wedge 803, $\theta_d$ denotes an angle of the cone 1001 that is the same as an angle between the outgoing diffraction rays and the edge on the wedge 803, that is, between the mesh elements 801, $\theta_{off}$ denotes an offset angle between two sequential diffraction rays, for example, $\hat{d}_n^{(j,p)}$ and $\hat{d}_n^{(j,p+1)}$, on the bottom circle of the cone 1001.

The SSL system 600 may transform the outgoing directions of the diffraction rays in a local space to a world space by aligning their coordinates $(\hat{e}_x, \hat{e}_y, \hat{e}_z)$. Here, $\hat{e}_z$ may extend along the edge on the wedge 803, that is, between the mesh elements 801 and $\hat{e}_x$ may extend to pass a center point of the wedge 803, that is, a center point on the space between the mesh points 801. Through this, the SSL system 600 may compute diffraction rays $\bar{r}_n^{(j)} = [\bar{r}_n^{(j-1)}, \ldots, \bar{r}_n^{(j,N_d)}]$ starting from the point $m_d$ defined on the wedge 803, based on the transformed outgoing directions. Here, the SSL system 600 may compute diffraction rays in a shadow region 1003 defined by the wedge 803. That is, the SSL system 600 may not compute the diffraction rays in a region excluding the invisible shadow region 1003, that is, in a visible illuminated region 1005.

The acoustic rays may progress to be close to the NLOS sound source 902 at a high probability since the acoustic rays are generated based on the audio signal output from the NLOS sound source 902. That is, at least a portion of the acoustic rays may converge to the NLOS sound source 902.

Accordingly, the SSL system 600 may estimate a position at which the at least a portion of the acoustic rays converge as the position of the NLOS sound source 902. Here, the SSL system 600 may estimate the position of the NLOS sound source 902 based on a position at which the diffraction ray and the reflection ray converge. For example, the SSL system 600 may localize the convergence position, that is, convergence point using a Monte-Carlo localization algorithm.

According to example embodiments, the SSL system 600 may further accurately estimate a position of a sound source, for example, the position of the NLOS sound source 902 in the indoor space. Here, although the obstacle 903 is present between the NLOS sound source 902 and the SSL system 600, the SSL system 600 may trace, that is, localize the position of the NLOS sound source 902. That is, the SSL system 600 may estimate the position of the NLOS sound source 902 by tracing the diffractions of the acoustic rays in the indoor space. In addition, the SSL system 600 may further accurately estimate the position of the NLOS sound source 902 by tracing the diffractions as well as the reflections of the acoustic rays in the indoor space.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for diffraction-aware non-line of sight (NLOS) sound source localization (SSL) implemented by a computer, the method comprising:
    generating a 3D model of an indoor space using a plurality of mesh elements and at least one wedge defined by a respective at least one pair of the plurality of mesh elements, the at least one wedge being associated with a wedge angle that is an angle between the at least one pair of the plurality of mesh elements;
    generating backward-propagating acoustic rays, representing a reverse-direction acoustic signal moving from a microphone array located in the indoor space towards an NLOS sound source, based on direction, magnitude, and frequency of a received audio signal, resulting from a source audio signal originating at the NLOS sound source, collected by the microphone array; and
    estimating a position of the NLOS sound source based on a point at which one or more of the generated backward propagating acoustic rays are diffracted as a result of the at least one wedge included in the 3D model of the indoor space, wherein the one or more of the generated backward propagating acoustic rays are diffracted in respective one or more diffraction directions determined based, at least in part, on the wedge angle associated with at least one wedge of the 3D model of the indoor space.

2. The method of claim 1, wherein the estimating comprises estimating the position of the NLOS sound source based on a position of the wedge in response to at least one of the backward-propagating acoustic rays being diffracted in a neighboring region of the wedge.

3. The method of claim 2, wherein the estimating further comprises estimating the position of the NLOS sound source based on a position at which at least one of the acoustic rays is reflected by the mesh element and the reflected acoustic ray converges.

4. The method of claim 3, wherein the estimating comprises estimating the position of the NLOS sound source to which the diffracted acoustic ray and the reflected acoustic ray converge.

5. The method of claim 1, wherein generating the 3D model comprises extracting the at least one wedge from between two of the mesh elements.

6. The method of claim 5, wherein the estimating comprises extracting the wedge in response to an angle between two of the mesh elements being less than a desired angle.

7. The method of claim 1, wherein the generating comprises generating the acoustic rays in a backward direction relative to a direction of the audio signal.

8. The method of claim 1, wherein the estimating comprises, at sequential iterations:
    sampling, at a first step instance, t, a plurality of particles with respect to an acoustic path corresponding to each of the backward-propagating acoustic rays;
    allocating a weight to each of the sampled particles based on a distance from the one of the backward-propagating acoustic rays that is diffracted;
    resampling, at a subsequent step instance, t+1, the sampled particles based on the allocated weight; and
    estimating the position of the NLOS sound source based on the resampled particles.

9. The method of claim 8, wherein the allocating comprises allocating a higher weight to the sampled particle that is closer to the one of the backward-propagating acoustic rays that is diffracted, with respect to the sampled particles.

10. The method of claim 1, wherein estimating the position of the NLOS comprises:
    determining region of convergence in which positions of at least one of the diffracted one or more of the generated backward propagating acoustic rays and one or more reflected rays from the generated backward propagating acoustic rays converge, wherein one or more of the plurality of mesh elements of the 3D model of the image reflect the one or more of the generated backward propagating acoustic rays to generate the one or more reflected rays.

11. A system for diffraction-aware non-line of sight (NLOS) sound source localization (SSL), the system comprising:
   a processor configured to generate a 3D model of an indoor space using a plurality of mesh elements and at least one wedge defined by a respective at least one pair of the plurality of mesh elements, the at least one wedge being associated with a wedge angle that is an angle between the at least one pair of the plurality of mesh elements;
   a signal collector configured to collect a received audio signal from the indoor space;
   an acoustic ray generator configured to generate backward-propagating acoustic rays, representing a reverse-direction acoustic signal moving from a microphone array located in the indoor space and towards an NLOS sound source, based on direction, magnitude, and frequency of the received audio signal, resulting from a source audio signal originating at the NLOS sound source; and
   a position estimator configured to estimate a position of the NLOS sound source based on a point at which one or more of the generated backward propagating acoustic rays are diffracted as a result of the at least one wedge included in the 3D model of the indoor space, wherein the one or more of the generated backward propagating acoustic rays are diffracted in respective one or more diffraction directions determined based, at least in part, on the wedge angle associated with at least one wedge of the 3D model of the indoor space.

12. The system of claim 11, wherein the position estimator is configured to estimate the position of the NLOS sound source based on a position of the wedge in response to at least one of the backward-propagating acoustic rays being diffracted in a neighboring region of the at least one wedge.

13. The system of claim 12, wherein the position estimator is configured to estimate the position of the NLOS sound source based on a position at which at least one of the acoustic rays is reflected by the mesh element and the reflected acoustic ray converges.

14. The system of claim 13, wherein the position estimator is configured to estimate the position of the NLOS sound source to which the diffracted acoustic ray and the reflected acoustic ray converge.

15. The system of claim 11, wherein the processor is configured to extract the at least one wedge from between two of the mesh elements.

16. The system of claim 15, wherein the processor is configured to extract the wedge in response to an angle between two of the mesh elements being less than a desired angle.

17. The system of claim 11, wherein the acoustic ray generator is configured to generate the acoustic rays in a backward direction relative to a direction of the received audio signal.

18. The system of claim 11, wherein the position estimator is configured to, at sequential iterations, sample, at a first step instance, t, a plurality of particles with respect to an acoustic path corresponding to each of the backward-propagating acoustic rays, to allocate a weight to each of the sampled particles based on a distance from the one of the backward-propagating acoustic rays that is diffracted, to resample, at a subsequent step instance, t+1, the sampled particles based on the allocated weight, and to estimate the position of the NLOS sound source based on the resampled particles.

19. The system of claim 18, wherein the position estimator is configured to allocate a higher weight to the sampled particle that is closer to the one of the backward-propagating acoustic rays that is diffracted, with respect to the sampled particles.

20. A method for diffraction-aware non-line of sight (NLOS) sound source localization (SSL) implemented by a computer, the method comprising:
   reconstructing an indoor space as a 3D model comprising a plurality of mesh elements and at least one wedge defined by a respective at least one pair of the plurality of mesh elements, the at least one wedge being associated with a wedge angle that is an angle between the at least one pair of the plurality of mesh elements;
   generating backward-propagating acoustic rays, representing a reverse-direction acoustic signal moving from a microphone array located in the indoor space towards an NLOS sound source, based on direction, magnitude, and frequency of a received audio signal, resulting from a source audio signal originating at the NLOS sound source, collected by the microphone array; and
   estimating a position of an NLOS sound source based on a point at which one or more of the acoustic rays are diffracted, wherein the one or more of the generated backward propagating acoustic rays are diffracted in respective one or more diffraction directions determined based, at least in part, on the wedge angle associated with at least one wedge of the 3D model of the indoor space, and wherein estimating the position of the NLOS sound source comprises, at sequential iterations:
      sampling, at a first step instance, t, a plurality of particles with respect to an acoustic path corresponding to each of the backward-propagating acoustic rays;
      allocating a weight to each of the sampled particles based on a distance from the one of the backward-propagating acoustic rays that is diffracted;
      resampling, at a subsequent step instance, t+1, the sampled particles based on the allocated weight; and
      estimating the position of the NLOS sound source based on the resampled particles.

21. A method for diffraction-aware non-line of sight (NLOS) sound source localization (SSL) implemented by a computer, the method comprising:
   generating a 3D model of an indoor space using a plurality of mesh elements and at least one wedge defined by a respective at least one pair of the plurality of mesh elements, the at least one wedge being associated with a wedge angle that is an angle between the at least one pair of the plurality of mesh elements;
   generating backward-propagating acoustic rays, representing a reverse-direction acoustic signal moving from a microphone array located in the indoor space towards an NLOS sound source, based on direction, magnitude, and frequency of a received audio signal, resulting from a source audio signal originating at the NLOS sound source, collected by the microphone array; and
   estimating a position of the NLOS sound source based on a point at which one or more of the generated backward propagating acoustic rays are diffracted as a result of the at least one wedge included in the 3D model of the indoor space, wherein the one or more of the generated backward propagating acoustic rays are diffracted in respective one or more diffraction directions determined based, at least in part, on the wedge angle associated with at least one wedge of the 3D model of the indoor space, and wherein estimating the position of the NLOS further comprises:
computing the one or more diffraction directions for the diffracted one or more of the generated backward propagating acoustic rays through application of a uniform theory of diffraction (UTD) process to an incoming group of backward propagating acoustic rays incident on the at least one wedge, according to:

$$\hat{d}_n^{(j,p)} = \begin{bmatrix} \cos\left(\frac{\theta_w}{2} + p \cdot \theta_{off}\right)\sin\theta_d \\ \sin\left(\frac{\theta_w}{2} + p \cdot \theta_{off}\right)\sin\theta_d \\ -\cos\theta_d \end{bmatrix}$$

wherein $\hat{d}_n^{(j,p)}$ denotes a unit vector of a $p^{th}$ diffraction ray among $N_d$ diffraction rays, $\theta_w$ denotes the wedge angle between neighboring mesh elements of the at least one wedge, $\theta_d$ denotes a cone angle between an edge of the at least one wedge and a diffraction cone defined by the diffracted one or more of the generated backward propagating acoustic rays, and $\theta_{off}$ denotes an offset angle between two sequential diffraction rays.

* * * * *